(12) United States Patent
Igura

(10) Patent No.: US 8,523,269 B2
(45) Date of Patent: Sep. 3, 2013

(54) VEHICLE BACK DOOR

(75) Inventor: Tsuyoshi Igura, Hiroshima (JP)

(73) Assignee: Daikyonishikawa Corporation, Hiroshima (JP)

( * ) Notice: Subject to any disclaimer, the term of this patent is extended or adjusted under 35 U.S.C. 154(b) by 0 days.

(21) Appl. No.: 13/139,281

(22) PCT Filed: Dec. 12, 2008

(86) PCT No.: PCT/JP2008/003753
§ 371 (c)(1),
(2), (4) Date: Jun. 10, 2011

(87) PCT Pub. No.: WO2010/067405
PCT Pub. Date: Jun. 17, 2010

(65) Prior Publication Data
US 2011/0241376 A1 Oct. 6, 2011

(51) Int. Cl.
*B60J 9/04* (2006.01)

(52) U.S. Cl.
USPC .................................... 296/146.8; 296/180.1

(58) Field of Classification Search
USPC .......................................... 296/146.8, 180.1
See application file for complete search history.

(56) References Cited

U.S. PATENT DOCUMENTS

| | | | |
|---|---|---|---|
| 4,874,654 A | 10/1989 | Funaki et al. | |
| 6,244,653 B1 | 6/2001 | Nishio et al. | |
| 7,226,117 B2 * | 6/2007 | Preiss | 296/180.1 |
| 7,490,891 B2 * | 2/2009 | Terakawa et al. | 296/180.1 |
| 7,578,542 B2 * | 8/2009 | Schreiber | 296/180.5 |
| 2002/0046517 A1 | 4/2002 | Kondo et al. | |
| 2006/0290169 A1 | 12/2006 | Fukushima et al. | |
| 2007/0170751 A1 | 7/2007 | Tanaka et al. | |
| 2008/0018134 A1 | 1/2008 | Schreiber | |

FOREIGN PATENT DOCUMENTS

| | | |
|---|---|---|
| CN | 101008307 A | 8/2007 |
| CN | 101108636 A | 1/2008 |
| FR | 2863210 A1 | 10/2005 |
| JP | 62-82281 U | 5/1987 |
| JP | 5-49426 U | 6/1993 |
| JP | 06-239275 | 8/1994 |
| JP | 6-340221 A | 12/1994 |
| JP | 09-052529 | 2/1997 |
| JP | 11-077740 | 3/1999 |
| JP | 2000-301985 A | 10/2000 |
| JP | 2002-46465 A | 2/2002 |
| JP | 2003-165336 A | 6/2003 |
| JP | 2005-022579 A | 1/2005 |
| JP | 2006-123840 A | 5/2006 |

(Continued)

OTHER PUBLICATIONS

International Search Report for PCT/JP2008/003753 dated Mar. 17, 2009.

(Continued)

*Primary Examiner* — Joseph Pape
(74) *Attorney, Agent, or Firm* — Nixon Peabody LLP; Joseph Bach, Esq.

(57) ABSTRACT

A vehicle window panel mounted in a window opening formed in a vehicle to close the opening includes a panel body obtained by molding a resin material. A light-transmitting window is integrally connected to the panel body, and a protrusion is integrally connected to the panel body to protrude toward at least one of an inside or outside of the vehicle.

1 Claim, 10 Drawing Sheets

(56) References Cited

FOREIGN PATENT DOCUMENTS

| JP | 2007-001521 | 1/2007 |
|----|-------------|--------|
| JP | 2007-276530 A | 10/2007 |
| WO | WO-99/17956 | 4/1999 |
| WO | WO 2005/053979 A1 | 6/2005 |

OTHER PUBLICATIONS

Chinese Office Action for Application No. 200880132289.5 dated Feb. 17, 2013.

* cited by examiner

VEHICLE BACK DOOR

CROSS-REFERENCE TO RELATED APPLICATION

This application is a National Phase of International Application No. PCT/JP2008/003753, which was filed on Dec. 12, 2008, and the disclosure of which is hereby incorporated herein by reference in its entirety.

TECHNICAL FIELD

The present invention relates to vehicle window panels mounted in window openings formed in vehicles.

BACKGROUND ART

Conventionally, it has been known that a window panel mounted in a window opening of a vehicle is made of a resin material to reduce vehicle weight as described in PATENT DOCUMENT 1. Furthermore, it has been known that in order to reduce vehicle weight, a back door includes an outer panel which includes a window panel of a glass material and is made of a resin material, and an inner panel made of a resin material as described in PATENT DOCUMENT 2.

CITATION LIST

Patent Document

PATENT DOCUMENT 1: Japanese Patent Publication No. 2007-276530
PATENT DOCUMENT 2: Japanese Patent Publication No. 2006-123840

SUMMARY OF THE INVENTION

Technical Problem

However, when a window panel is molded of a resin material as described in PATENT DOCUMENT 1, the window panel can be lighter than when a typical sheet glass is used. On the other hand, since a resin material is less rigid than sheet glass, this may prevent a rigid window panel from being provided. When a window panel has low rigidity, this reduces the rigidity of the entire vehicle body, and thus, is not preferable for safety reasons during vehicle travel; and furthermore, for example, when the vehicle is washed, or when the washed vehicle is wiped, the window panel is bent toward the inside of the vehicle by pressing the window panel, and thus, is less marketable. When the thickness of a window panel is increased to address the above problem, this increases the weight of the window panel to thereby prevent reduction in weight from being facilitated, furthermore tends to cause shrinkage, etc., to thereby make it difficult to mold a window panel with a high degree of accuracy, and thus, may degrade the appearance of the window panel.

Moreover, in PATENT DOCUMENT 2, the weight of a back door itself is reduced. However, since a window panel forming a window is made of a glass material which is heavier than a resin material, the window panel is preferably made of a resin material to reduce the weight of the window panel.

The present invention has been made in view of the foregoing point, and it is an object of the present invention to ensure sufficient rigidity of a window panel without increasing the thickness thereof when the window panel is molded of a resin material, thereby further reducing the weight of the window panel and obtaining the window panel with good appearance.

Solution to the Problem

In order to achieve the above object, a first aspect of the invention is directed to a vehicle window panel mounted in a window opening formed in a vehicle to close the opening. The vehicle window panel includes a panel body obtained by molding a resin material. A light-transmitting window is integrally connected to the panel body, and a protrusion is integrally connected to the panel body to protrude toward at least one of an inside or outside of the vehicle.

A second aspect of the invention is directed to the vehicle window panel of the first aspect of the invention, wherein the window panel is mounted in the window opening formed in a back portion of the vehicle.

A third aspect of the invention is directed to the vehicle window panel of the second aspect of the invention, wherein the protrusion is a spoiler integrally connected to an upper portion of the panel body to protrude toward the outside of the vehicle in a width direction of the vehicle.

A fourth aspect of the invention is directed to the vehicle window panel of the second or third aspect of the invention, wherein a light-transmitting portion is integrally connected to the panel body to transmit light from a stop lamp assembly disposed on an inner surface of the panel body in the vehicle to the outside of the vehicle.

A fifth aspect of the invention is directed to the vehicle window panel of the fourth aspect of the invention, wherein a stop lamp assembly receptacle is integrally connected to an upper or lower portion of the panel body to protrude toward the outside of the vehicle in a width direction of the vehicle, and the light-transmitting portion is integrally connected to the receptacle.

A sixth aspect of the invention is directed to the vehicle window panel of the fourth or fifth aspect of the invention, wherein a housing in which the stop lamp assembly is disposed is integrally connected to the panel body, and the protrusion is formed by the housing.

A seventh aspect of the invention is directed to the vehicle window panel of any one of the first through sixth aspects of the invention, wherein the window opening is formed in a back door configured to open or close a tailgate formed in a back portion of the vehicle, the back door includes an inner panel having the window opening and made of a resin material, and an outer panel made of a resin material placed on the inner panel to close at least the window opening, and the window panel is the outer panel.

An eighth aspect of the invention is directed to the vehicle window panel of the seventh aspect of the invention, wherein the protrusion is a vertically extending linear protrusion which protrudes from both ends of the panel body in a width direction of the vehicle to the outside or inside of the vehicle and which is configured to guide rain water.

A ninth aspect of the invention is directed to the vehicle window panel of the seventh aspect of the invention, wherein an upper end portion of the back door is coupled through hinges to a portion of the vehicle located immediately above an upper end of the tailgate to open or close the back door, and projections are integrally connected to portions of the panel body corresponding to the hinges to project toward the outside of the vehicle.

Advantages of the Invention

According to the first aspect of the invention, the window is integrally connected to the panel body obtained by molding the resin material, thereby reducing the weight of the window with resinification of the window. The protrusion is integrally connected to the panel body, thereby advantageously enhancing the rigidity of the panel body. This eliminates the need for increasing the thickness of the panel body, thereby further reducing the weight of the window panel and molding the window panel with a high degree of accuracy with a reduction in shrinkage, etc. Thus, the window panel with good appearance can be obtained.

According to the second aspect of the invention, the weight of the window panel mounted in the window opening formed in the back portion of the vehicle can be reduced, and the window panel with good appearance can be obtained.

According to the third aspect of the invention, the spoiler integrally connected to the panel body can enhance the rigidity of the window panel.

According to the fourth aspect of the invention, when the stop lamp assembly is disposed on an inner surface of the panel body in the vehicle, the panel body is molded of a resin material. Therefore, the light-transmitting portion through which light from the stop lamp assembly is transmitted can be easily integrally connected to the panel body, thereby advantageously reducing parts count.

According to the fifth aspect of the invention, the receptacle for accommodating the stop lamp assembly can be easily integrally connected to the panel body, and thus, the receptacle can enhance the rigidity of the window panel.

According to the sixth aspect of the invention, the housing in which the stop lamp assembly is disposed can be easily integrally connected to the panel body, and thus, the housing can enhance the rigidity of the window panel.

According to the seventh aspect of the invention, the outer panel of the back door is a window panel made of a resin material to which the light-transmitting window is integrally connected. This can reduce the weight of the back door.

According to the eighth aspect of the invention, when the back door is opened, and rain water adhering to the outer surface of a portion of the vehicle corresponding to the panel body flows to both ends of the panel body in the width direction of the vehicle, the rain water is guided in a vertical direction of the panel body by the linear protrusion for guiding rain water. This can reduce the flow of rain water down from both the ends of the back door in the width direction of the vehicle. The linear protrusion for guiding rain water can enhance the rigidity of the window panel.

According to the ninth aspect of the invention, the projections are formed on the panel body to correspond to the hinges through which the back door is fixed to the panel body so that the back door can be opened or closed, and thus, the projections can enhance the rigidity of the window panel.

DESCRIPTION OF REFERENCE CHARACTERS

1 Back Door
2 Outer Panel (Window Panel)
3 Inner Panel
10 Upper Portion (Panel Body)
11 Lower Portion
12 Rear Spoiler (Protrusion)
13 Window
14 Projection
15 Stop Lamp Assembly
16 Light-Transmitting Portion
20 Housing (Protrusion)
21 Left Linear Protrusion for Guiding Rain Water (Protrusion)
22 Right Linear Protrusion for Guiding Rain Water (Protrusion)
27 License Plate Fixing Portion (Protrusion)
42 Window Opening
47 Protrusion
50 Window Opening
60 Rear Window Panel
61 Panel Body
64 Stop Lamp Assembly Receptacle
100, 110 Vehicle
101 Tailgate
102 Hinge

DESCRIPTION OF EMBODIMENTS

Embodiments of the present invention will be described below in detail with reference to the drawings. The following preferred embodiments are merely examples in nature, and are not intended to limit the scope, applications, and use of the invention.

First Embodiment of the Invention

Figure 1:
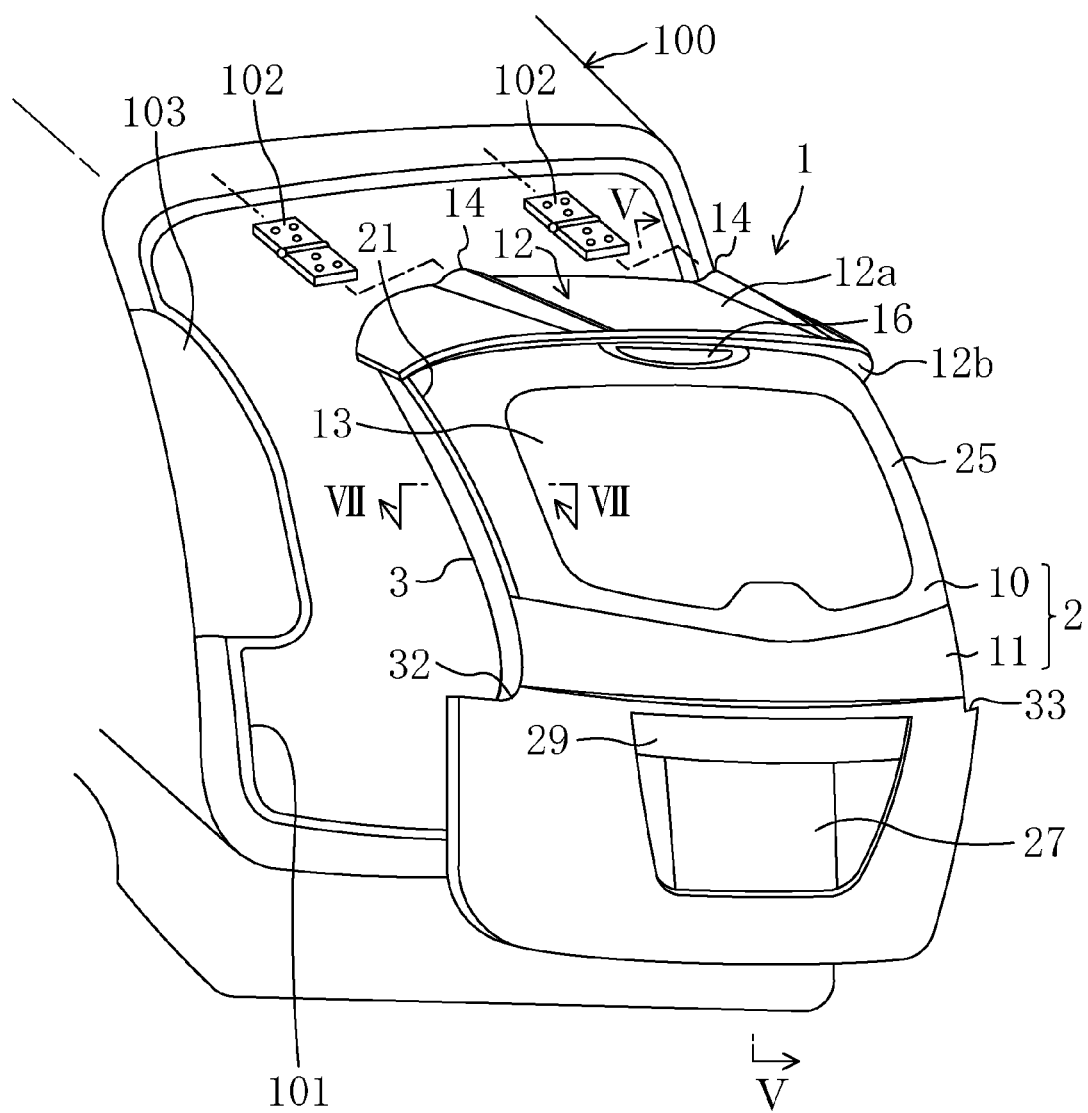
FIG. 1 is an exploded perspective view of a vehicle according to a first embodiment of the present invention when viewed from behind.

FIG. 1 illustrates a back portion of a hatchback vehicle 100 according to a first embodiment of the present invention. In this first embodiment, a window opening 42 (illustrated in FIG. 2) is formed in a back door 1 configured to open or close a tailgate 101 formed in the back portion of the vehicle 100, and a vehicle window panel of the present invention is formed by an outer panel 2 which is a portion of the back door 1. In description of this embodiment, the left of the vehicle 100 in a width direction thereof is simply referred to as the "left," and the right thereof in the width direction is simply referred to as the "right."

One ends of hinges 102, 102 each having a laterally extending rotation axis are fixed to both right and left parts, respectively, of a portion of the vehicle 100 located immediately above the upper end of the tailgate 101. The other ends of the hinges 102, 102 are fixed to both right and left parts, respectively, of an upper end portion of the back door 1. Specifically, the upper end portion of the back door 1 is coupled through the hinges 102, 102 to a portion of the vehicle 100 located immediately above the upper end of the tailgate 101 so that the back door 1 can be opened or closed. The reference character 103 in FIG. 1 denotes combination lamps.

Figure 2:
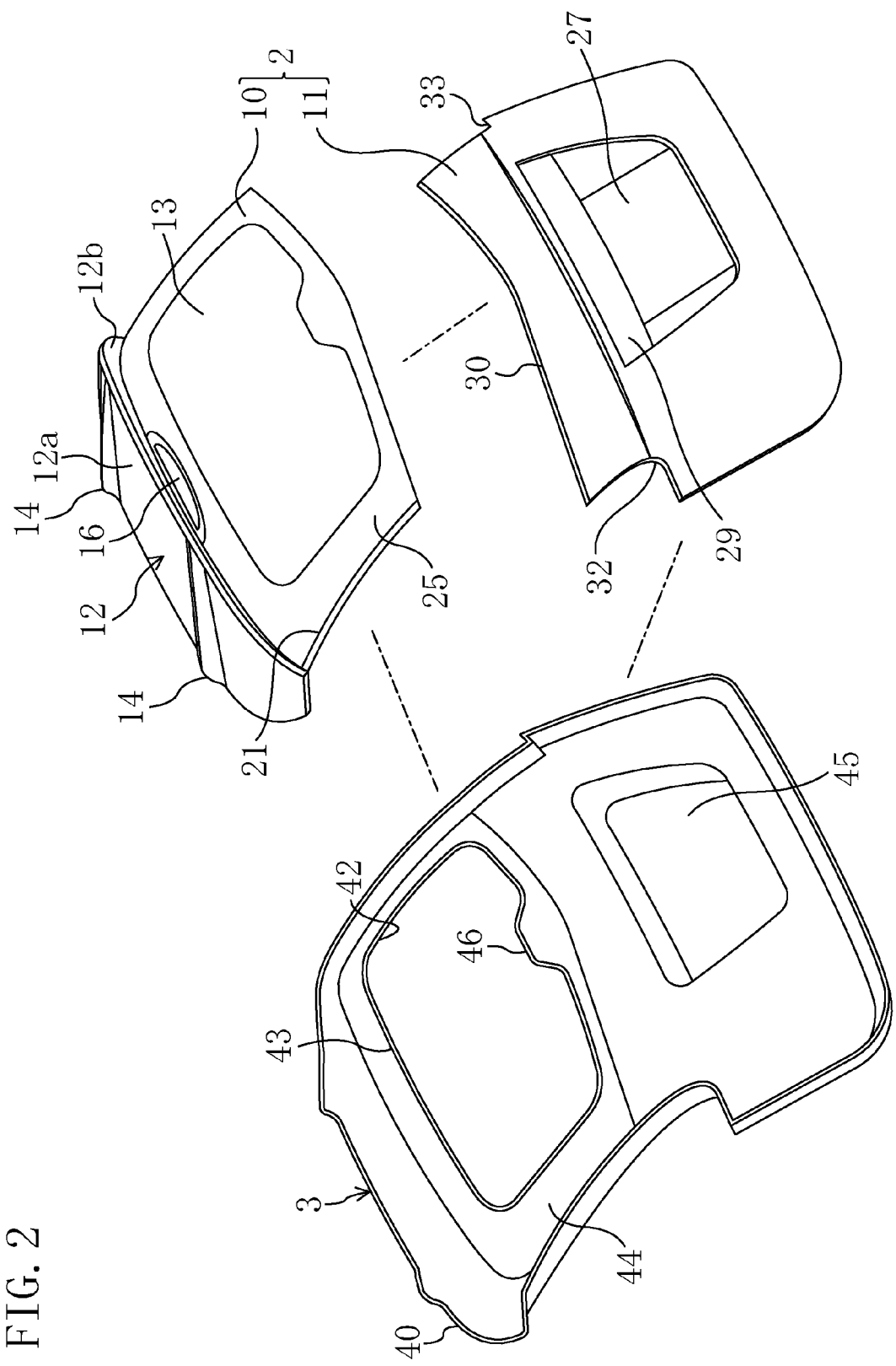
FIG. 2 is an exploded perspective view of a back door in FIG. 1.

As illustrated in FIG. 2, the back door 1 includes the outer panel 2 located outward of the vehicle, and an inner panel 3 located inward of the vehicle.

Figure 3:
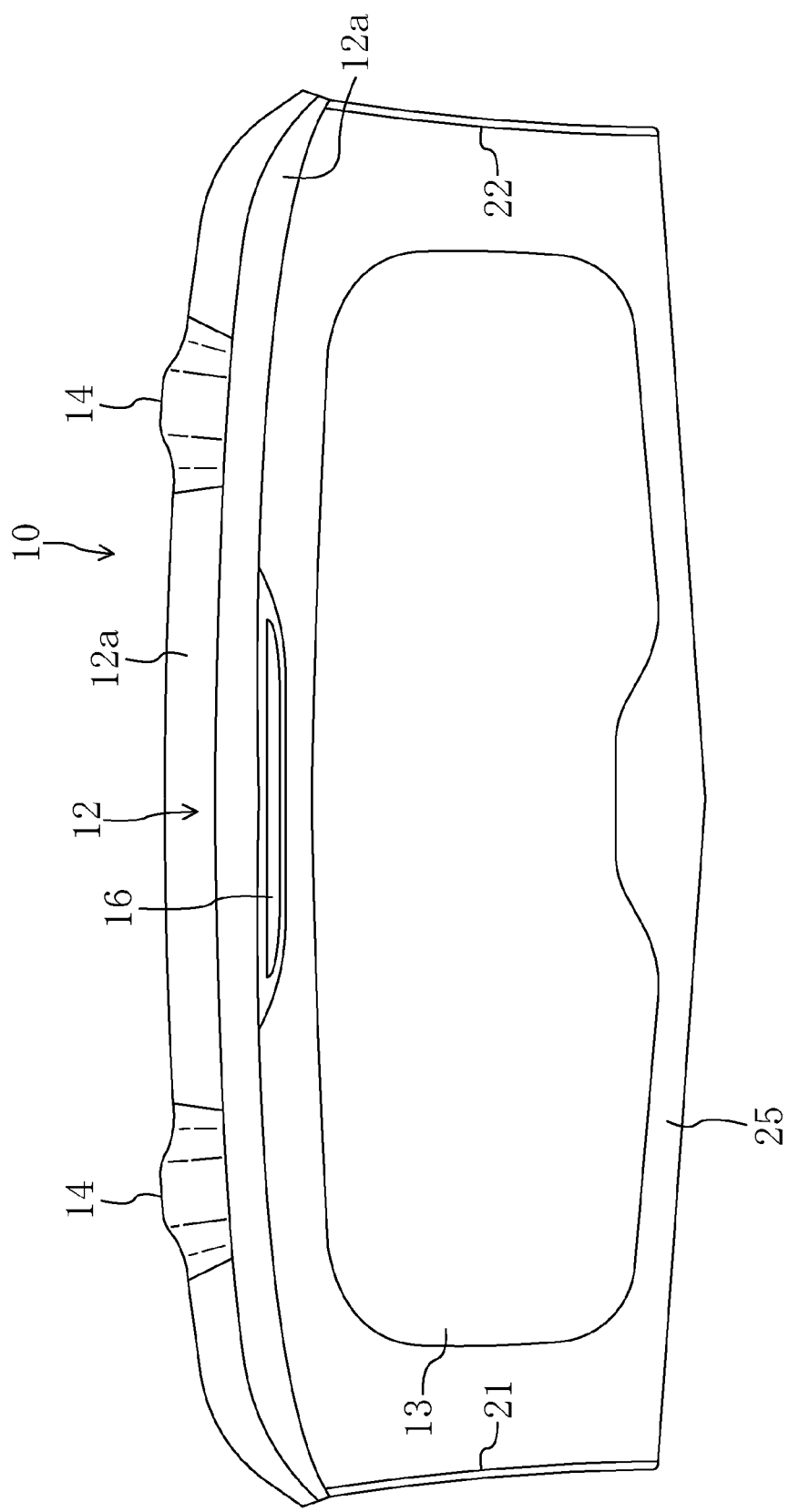
FIG. 3 is a diagram of an upper portion of an outer panel in FIG. 2 when viewed from behind the vehicle.
Figure 4:
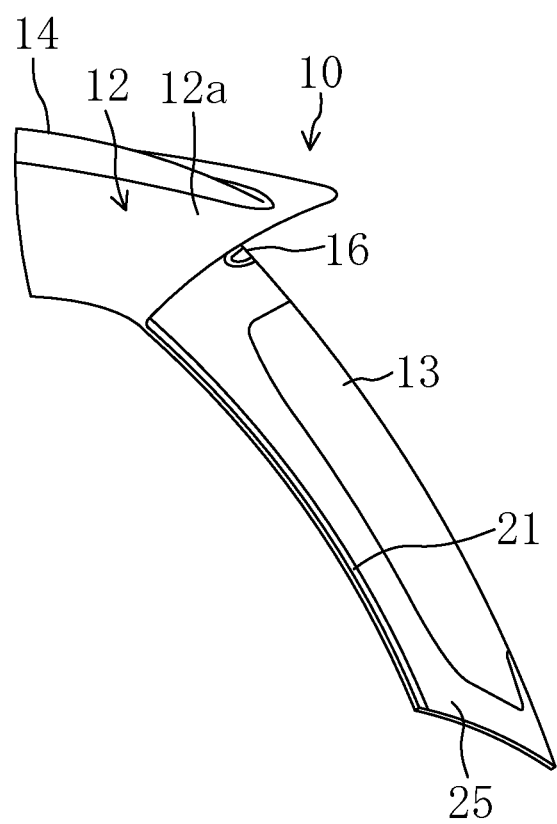
FIG. 4 is a side view of the upper portion of the outer panel in FIG. 2.

The outer panel 2 is divided into two portions, i.e., a substantially upper half portion and a substantially lower half portion, and thus, includes an upper portion 10 and a lower portion 11. The upper portion 10 and the lower portion 11 are both obtained by molding a transparent resin material. Examples of the resin material include a polycarbonate resin. As illustrated also in FIG. 3, the entire upper portion 10 is in the shape of a laterally extending rectangular plate, and in a situation where the back door 1 is attached to the vehicle 100 as illustrated in FIG. 4, the upper portion 10 is inclined so that a lower portion of the upper portion 10 is located closer to the back of the vehicle than an upper portion thereof is.

A laterally extending rear spoiler (protrusion) 12 protruding from the upper portion 10 toward the back of the vehicle (the outside thereof) is integrally connected to the upper portion of the upper portion 10. The rear spoiler 12 extends from the left end of the upper portion 10 to the right end thereof as illustrated in FIGS. 2 and 3. A window 13 is integrally connected to the upper portion 10 below the rear spoiler 12.

Figure 5:
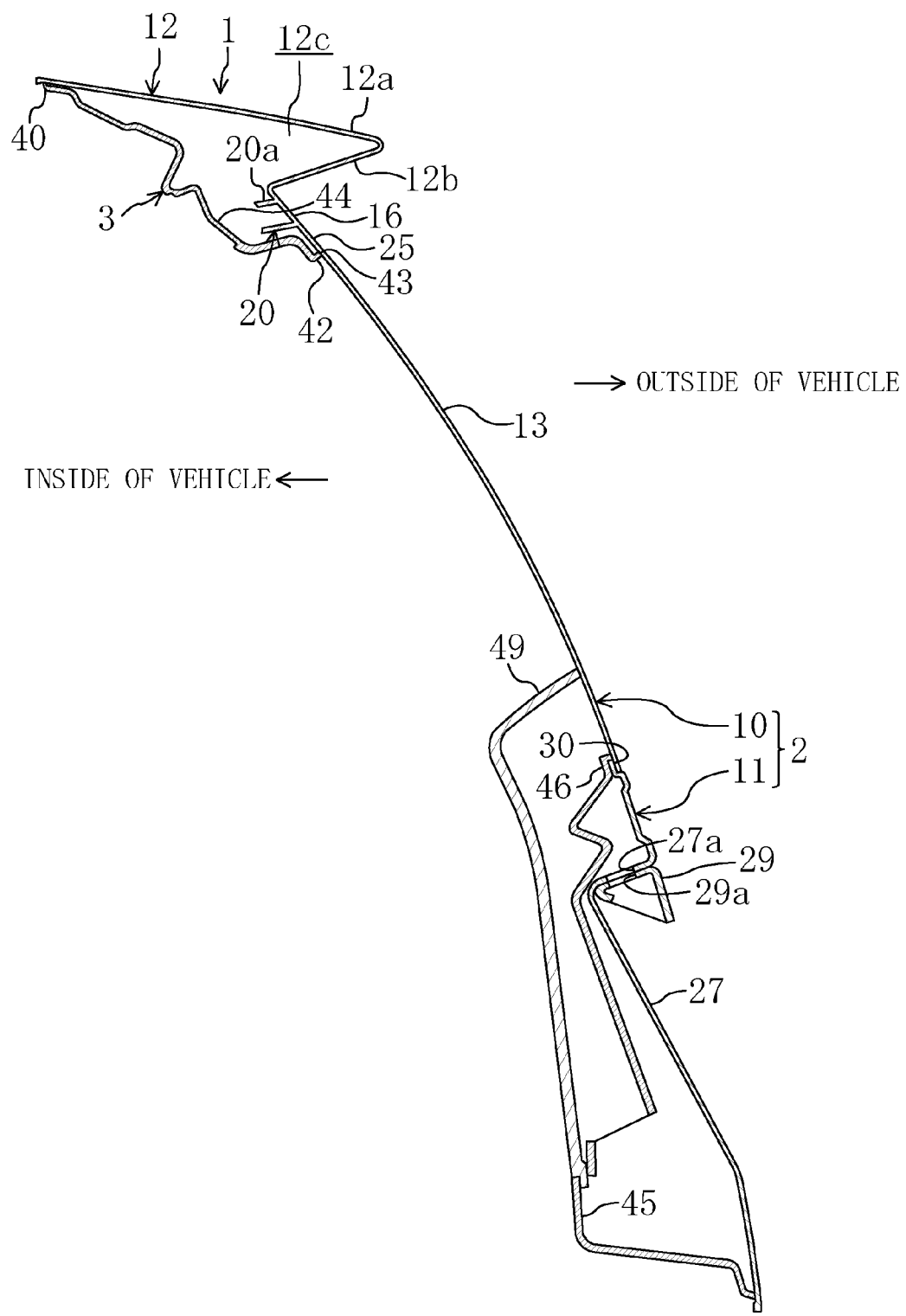
FIG. 5 is a cross-sectional view taken along the line V-V in FIG. 1.
Figure 6:
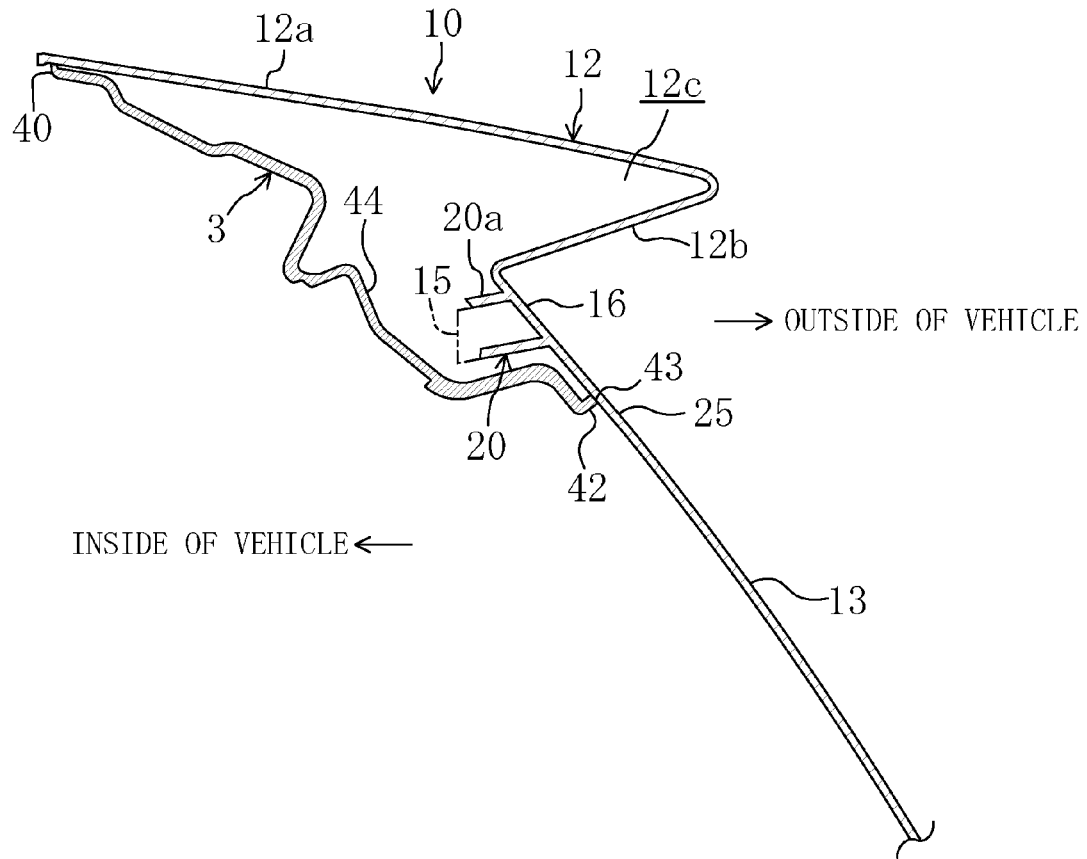
FIG. 6 is an enlarged cross-sectional view of an upper portion of the back door in FIG. 5.

As illustrated in FIGS. 5 and 6, the rear spoiler 12 includes an upper wall 12a and a lower wall 12b both extending in the longitudinal direction of the vehicle. The upper wall 12a is inclined downward toward the back of the vehicle, and a back end portion of the upper wall 12a is located closer to the back of the vehicle than an upper end portion of the window 13 is. As illustrated in FIGS. 1 and 3, a left part of the upper wall 12a of the rear spoiler 12 is curved downward toward the left end, and a right part thereof is curved downward toward the right end. As illustrated in FIG. 2, projections 14, 14 projecting upward are integrally connected to regions of the upper wall 12a of the rear spoiler 12 corresponding to the hinges 102, 102, respectively. The projections 14, 14 extend from one end of the upper wall 12a in the longitudinal direction of the vehicle to the other end thereof, thereby improving the rigidity of the rear spoiler 12, and furthermore, improving the rigidity of the upper portion 10.

As illustrated in FIGS. 5 and 6, the length of the lower wall 12b of the rear spoiler 12 in the longitudinal direction of the vehicle is set shorter than that of the upper wall 12a, and the lower wall 12b is inclined upward toward the back of the vehicle. A back end portion of the lower wall 12b is continuous with a back end portion of the upper wall 12a, and the rear spoiler 12 includes a space 12c formed by the upper wall 12a and the lower wall 12b. Since, as described above, the rear spoiler 12 having the laterally extending space 12c is integrally connected to the upper portion 10 to project from the outer surface of a portion of the vehicle corresponding to the upper portion 10 to the back of the vehicle, the upper portion 10 is lightweight, and has high rigidity. Specifically, even with a reduction in the thickness of the upper portion 10, sufficient rigidity of the upper portion 10 can be ensured, and thus, the moldability of the upper portion 10 is excellent.

The lower wall 12b of the rear spoiler 12 is molded to protrude generally perpendicularly to the outer surface of a portion of the vehicle corresponding to the upper portion 10, thereby ensuring greater rigidity.

The thickness of the window 13 of the upper portion 10 may be different from or identical with that of a portion of the upper portion 10 other than the window 13.

A stop lamp assembly 15 is provided inside a portion of the vehicle corresponding to the upper portion 10 as illustrated by the virtual line in FIG. 6. The stop lamp assembly 15 forms a so-called high-mount stop lamp, and is located high in a laterally central portion of the upper portion 10 so as to be closer to the lower end of the rear spoiler 12 (i.e., located in an upper portion of the upper portion 10). A transparent light-transmitting portion 16 is integrally connected to a portion of the upper portion 10 corresponding to the stop lamp assembly 15 to transmit light from the stop lamp assembly 15 to the outside of the vehicle. As illustrated in FIGS. 1-3, the light-transmitting portion 16 is inclined downward toward the back of the vehicle, and extends laterally. The light-transmitting portion 16 forms a lens.

A housing (protrusion) 20 into which the stop lamp assembly 15 is to be fitted is integrally connected to the upper portion 10. The housing 20 protrudes from the perimeter of the light-transmitting portion 16 to the inside of the vehicle, and is formed in the shape of a frame surrounding the entire perimeter of the light-transmitting portion 16. The stop lamp assembly 15 is fitted into the housing 20 so as to be accommodated inside the housing 20. An upper wall 20a of the housing 20 is located below the lower wall 12b of the rear spoiler 12. The housing 20 also enhances the rigidity of the upper portion 10.

Figure 7:
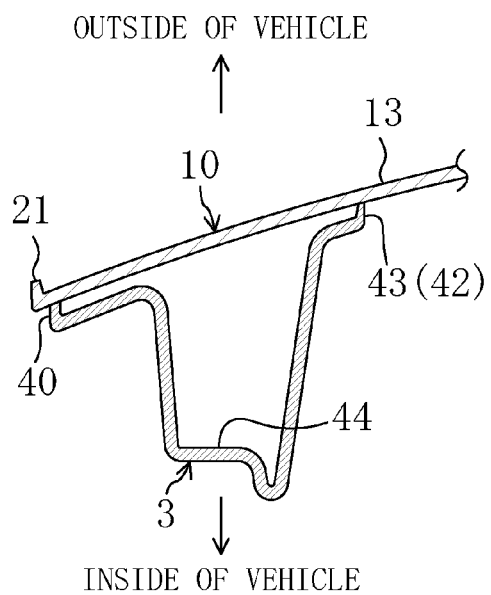
FIG. 7 is a cross-sectional view taken along the line VII-VII in FIG. 1.

As illustrated in FIGS. 3 and 7, left and right linear protrusions (protrusions) 21 and 22 for guiding rain water are integrally connected to left and right end portions, respectively, of the upper portion 10 to protrude toward the back of the vehicle and extend vertically along the corresponding end portions. When the back door 1 is opened in the rain, etc., the linear protrusions 21 and 22 serve to prevent rain water adhering to the outer surface of a portion of the vehicle corresponding to the upper portion 10 from flowing down from both the right and left end portions of the upper portion 10 to both the right and left thereof. Specifically, since the opening of the back door 1 allows a laterally central portion of the back door 1 to be higher than each of the right and left ends thereof, rain water adhering to the outer surface of a portion of the vehicle corresponding to the upper portion 10 flows along the outer surface of a portion of the vehicle corresponding to the upper portion 10 toward both of the right and left ends. In this case, provision of the linear protrusions 21 and 22 reduces the flow of rain water from both the right and left ends of the upper portion 10 down to the right and left thereof, and such rain water is guided above the upper portion 10, and then drained through an upper end portion of the upper portion 10 to a portion of the vehicle 100 located above the tailgate 101. The linear protrusions 21 and 22 also enhance the rigidity of the upper portion 10.

The shape of each of the linear protrusions 21 and 22 can be set to form an optional shape based on the shape of the back door 1 other than a linear shape. Moreover, in order to enhance the rigidity of the upper portion 10, the linear protrusions 21 and 22 may be molded to protrude toward the front of the vehicle (the inside thereof), or may be molded to protrude toward both of the front and back of the vehicle (the inside and outside thereof). In addition, although not shown, a linear protrusion (protrusion) may be formed on a portion of the upper portion 10 located immediately below the lower end of the window 13 to protrude toward at least one of the back of the vehicle (the outside thereof) or the front thereof (the inside thereof). The linear protrusion located on the portion of the upper portion 10 located immediately below the lower end of the window 13 may be continuous with the linear protrusions 21 and 22, thereby enhancing rigidity.

The inner surface of a region of the vehicle corresponding to a surrounding area of the window 13 of the upper portion 10 and a surrounding area of the light-transmitting portion 16 is painted with a black paint. The region painted with the black paint is denoted by the reference character 25 in the drawings. The outer surface of a portion of the vehicle corresponding to the rear spoiler 12 of the upper portion 10 is painted with the body color. The outer surface of the portion of the vehicle corresponding to the upper portion 10 is coated to prevent damage, thereby reducing damage to the window 13.

As illustrated in FIGS. 1 and 2, the entire lower portion 11 of the outer panel 2 is formed in the shape of a laterally extending rectangular plate. A license plate fixing portion 27 to which a license plate (not shown) is to be fixed is integrally connected to a generally central portion of the lower portion 11 to protrude toward the inside of the vehicle. As illustrated in FIG. 5, the license plate fixing portion 27 significantly protrudes upward toward the inside of the vehicle. A through hole 27a is formed in an upper portion of the license plate fixing portion 27 to pass light from a lamp (not shown) for illuminating the license plate therethrough. Moreover, as illustrated in FIG. 1, a laterally extending plate 29 is fitted to the upper portion of the license plate fixing portion 27. As illustrated in FIG. 5, a through hole 29a is formed in the plate 29 to correspond to the through hole 27a of the license plate fixing portion 27.

The license plate fixing portion 27 protruding toward the inside of the vehicle as described above is integrally connected to the lower portion 11, thereby enhancing the rigidity of the lower portion 11. This enables a reduction in the thickness of the lower portion 11.

An upper end portion of the lower portion 11 includes a step 30 formed so as to be recessed toward the inside of the vehicle. The step 30 extends from the left end of the lower portion 11 to the right end thereof. A lower end portion of the upper portion 10 is fitted onto the step 30, and the lower end portion of the upper portion 10 and the upper end portion of the lower portion 11 overlap with each other in the longitudinal direction of the vehicle. The lower end portion of the upper portion 10 and the upper end portion of the lower portion 11 are bonded to each other with a well-known adhesive. The lower end portion of the upper portion 10 and the upper end portion of the lower portion 11 may be welded to each other.

As illustrated in FIGS. 1 and 2, notches 32 and 33 are formed in both the left and right ends, respectively, of an upper portion of the lower portion 11. The shape of each of the notches 32 and 33 correspond to the shape of the corresponding combination lamp 103.

As illustrated in FIG. 2, the inner panel 3 is an integral article obtained by molding, for example, a resin material, such as polypropylene, into which glass fibers are mixed by injection molding. An outer adhesion portion 40 is integrally connected to the entire perimeter of the inner panel 3 to protrude toward the perimeter of the outer panel 2. Furthermore, a window opening 42 is formed in an upper half portion of the inner panel 3 to correspond to the window 13 of the outer panel 2. An inner adhesion portion 43 is integrally connected to a portion of the inner panel 2 located around the entire perimeter of the opening 42 to protrude toward the perimeter of the window 13 of the outer panel 2. The outer adhesion portion 40 and the inner adhesion portion 43 are bonded to the outer panel 2 with a well-known adhesive, thereby integrating the outer panel 2 and the inner panel 3 together.

An upper recess 44 is formed around the window opening 42 of the inner panel 3 so as to be recessed toward the inside of the vehicle. The groove-like upper recess 44 extends along the perimeter of the window opening 42. A lower recess 45 is formed below the window opening 42 of the inner panel 3 so as to be recessed toward the inside of the vehicle while corresponding to the license plate fixing portion 27 of the outer panel 2. As illustrated in FIG. 5, an adhesion portion 46 is integrally connected to the step 30 of the lower portion 11 above the lower recess 45 of the inner panel 3 so as to be placed on a surface of the step 30 located near the inside of the vehicle. The adhesion portion 46 is bonded to the vicinity of the step 30 of the lower portion 11. The reference character 49 is shown only in FIG. 5, and denotes a trim component.

Next, the manner in which the back door 1 configured as described above is manufactured will be described. First, the upper portion 10 and the lower portion 11 of the outer panel 2 are obtained by molding a transparent polycarbonate resin by injection molding. By contrast, the inner panel 3 is obtained by injecting a polypropylene resin into which glass fibers are mixed. Then, the inner surface of a portion of the vehicle corresponding to a surrounding area of the window 13 of the upper portion 10 and a surrounding area of the light-transmitting portion 16 are painted with a black paint. The outer surfaces of portions of the vehicle corresponding to the rear spoiler 12 of upper portion 10 and the lower portion 11 are painted with the body color. After the painting, the upper portion 10 and the lower portion 11 of the outer panel 2 are bonded to each other, and the upper portion 10 and the lower portion 11 are bonded to the inner panel 3, thereby closing the window opening 42 using the outer panel 2, and integrating the outer panel 2 and the inner panel 3 together by overlapping the panels.

As described above, according to the first embodiment, the window 13 is integrally connected to the upper portion 10 of the outer panel 2 made of resin, thereby enabling resinification of the window 13, and eliminating the need for a fixing structure to which a conventional sheet glass is to be fixed. This can reduce the weight of the back door 1. Moreover, the rear spoiler (protrusion) 12, the housing (protrusion) 20, the linear protrusions (protrusions) 21 and 22 are integrally connected to the upper portion 10, thereby enhancing not only the rigidity of the upper portion 10 but also the rigidity of the window 13 integrally connected to the upper portion 10.

Since an upper portion of the upper portion 10 including the rear spoiler 12 and a portion of the inner panel 3 located above the upper end of the window opening 42 are bonded to each other through the outer adhesion portion 40 and the inner adhesion portion 43, the rear spoiler 12 of the back door 1 has a closed cross-sectional shape having the space 12c, thereby further enhancing the rigidity of the back door 1.

Furthermore, since sufficient rigidity of the upper portion 10 can be ensured, the weight of the upper portion 10 can be reduced by reducing the thickness thereof, and the moldability of the upper portion 10 can be enhanced to mold the upper portion 10 with a high degree of accuracy. Thus, the upper portion 10 with good appearance can be obtained.

Moreover, the rear spoiler 12 and the housing 20 are integrally connected to the upper portion 10, thereby reducing parts count.

Figure 8:
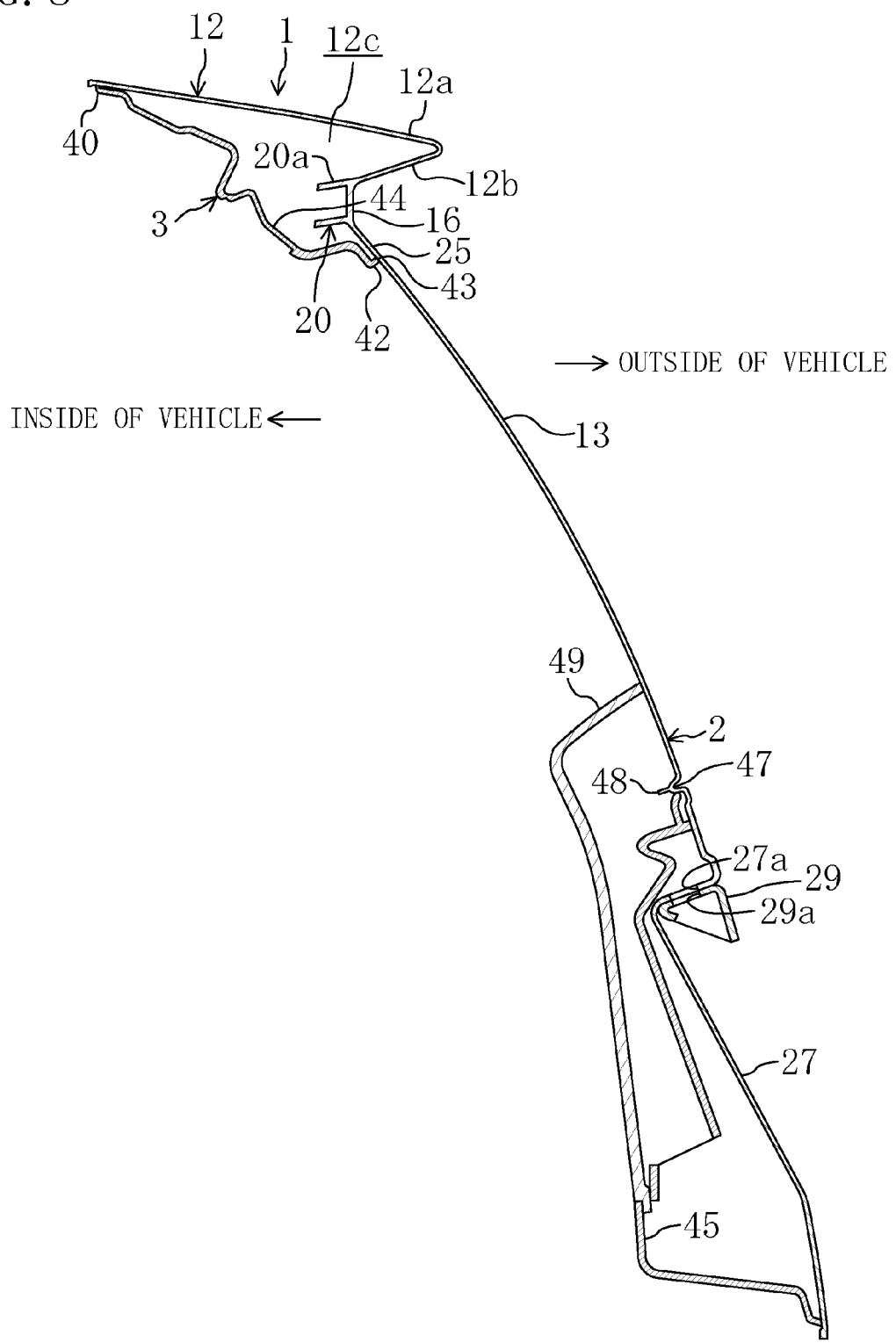
FIG. 8 is a diagram corresponding to FIG. 5 according to a first variation of the first embodiment.

In the embodiment, the outer panel 2 is divided into the upper portion 10 and the lower portion 11. However, the structure of the outer panel 2 is limited to the above structure. As in a first variation illustrated in FIG. 8, the outer panel 2 may be an integral article. Thus, the license plate fixing portion (protrusion) 27 formed in the lower portion 11 improves the rigidity of the entire outer panel 2. Moreover, in the first variation, a laterally extending protrusion 47 is formed at the boundary between the upper portion 10 and the lower portion 11 to protrude toward the front of the vehicle (the inside thereof), and a linear protrusion 48 laterally extending along the protrusion 47 is formed on a front end portion of the protrusion 47 in the direction of the protrusion thereof to protrude toward the front of the vehicle (the inside thereof). This can further enhance the rigidity of the boundary between the upper portion 10 and the lower portion 11. The protrusion 47 and the linear protrusion 48 may be continuous with the linear protrusions 21 and 22. This can enhance rigidity. Multiple ones of each of the protrusion 47 and the linear protrusion 48 may be provided.

Figure 9:
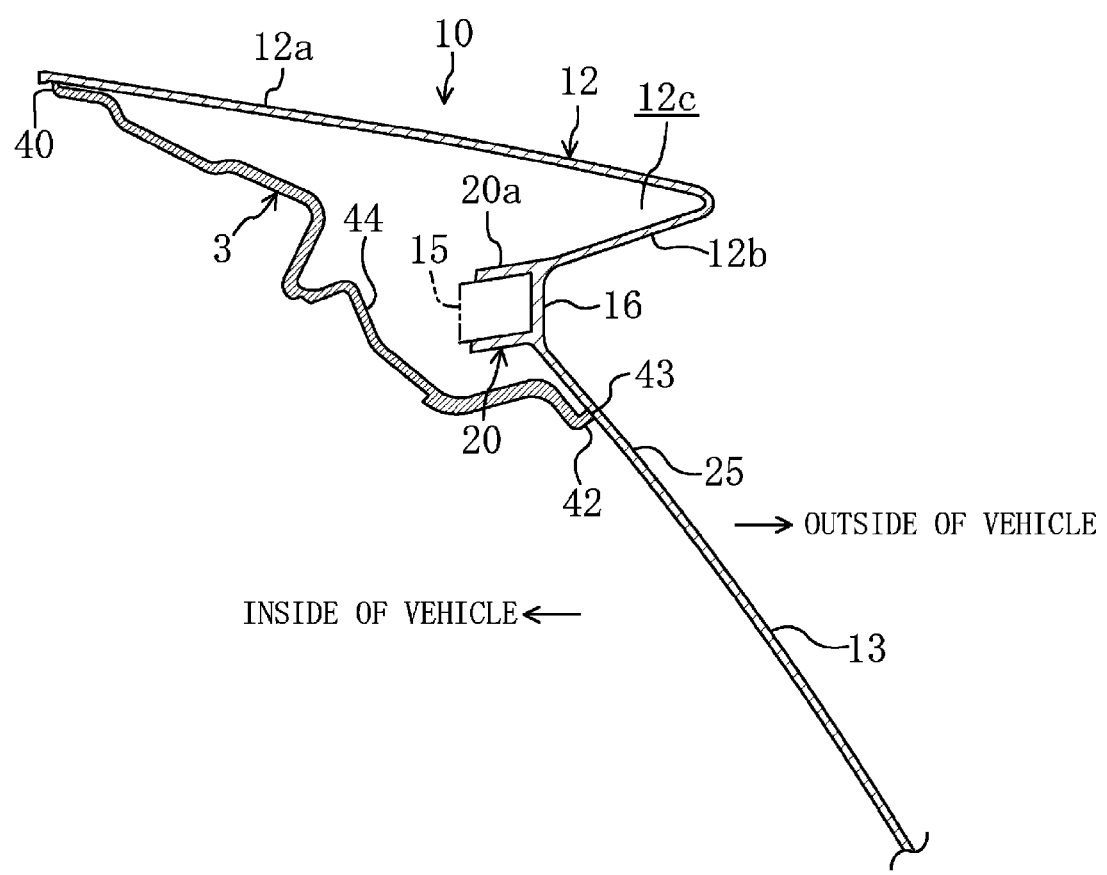
FIG. 9 is a diagram corresponding to FIG. 6 according to a second variation of the first embodiment.

As in a second variation illustrated in FIG. 9, the light-transmitting portion 16 may be formed to extend perpendicularly, and the upper wall 20a of the housing 20 may be continuous with the lower wall 12b of the rear spoiler 12.

In the first embodiment, the upper portion 10 and the lower portion 11 of the outer panel 2 are molded of a light-transmitting resin material. However, the upper portion 10 may be molded of a light-transmitting resin material, and the lower portion 11 may be molded of a non-light-transmitting resin material.

In the first embodiment, the rear spoiler 12, the housing 20, the linear protrusions 21 and 22, and the license plate fixing portion 27 are integrally connected to the outer panel 2. However, this is not restrictive. Only one or optional ones of the protrusions 12, 20, 21, 22, 27, 47, and 48 may be integrally connected to the outer panel 2.

In the first embodiment, the case where the window opening 42 is formed in the back door 1, and the vehicle window panel of the present invention corresponds to the outer panel 2, and forms a portion of the back door 1 was described. However, this is not restrictive. Although not shown, for example, a window opening may be formed in a side door for opening or closing a side door opening formed in a side portion of the vehicle 100, and a vehicle window panel may be fitted to the side door. In this case, the side door may be a sliding door or a door rotatably supported by hinges.

In the first embodiment, the vehicle window panel is fixed. However, the vehicle window panel may be movable using a lifting and lowering device, etc.

The resin material forming the outer panel 2 is not limited to a polycarbonate resin, and as long as the resin material is a light-transmitting resin material, it is not particularly limited, and may be, e.g., a tinted resin material. Moreover, an optional resin material can be selected also as the resin material forming the inner panel 3. The resin material forming the outer panel 2 may be identical with the resin material forming the inner panel 3. Alternatively, the resin material forming the upper portion 10 and the resin material forming the lower portion 11 may be different. Housings for the combination lamps may be integrally connected to the outer panel 2.

Two or more windows 13 or two or more light-transmitting portions 16 may be integrally connected to the outer panel 2. A light-transmitting portion through which light for illuminating the license plate is transmitted may be used as the light-transmitting portion 16.

Moreover, since the window 13 is molded of a resin material, this increases the flexibility in setting the shape of the window 13 as compared with when glass is used as a material of the window 13, and facilitates improving the design aesthetics of the window 13 and allowing the light-transmitting portion 16 to form a lens shape. The thickness of the window 13 may vary from point to point.

Second Embodiment of the Invention

Figure 10:
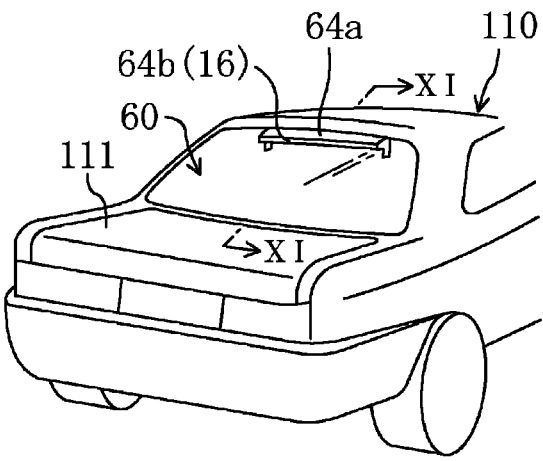
FIG. 10 is a perspective view of a vehicle according to a second embodiment when viewed from behind.
Figure 11:
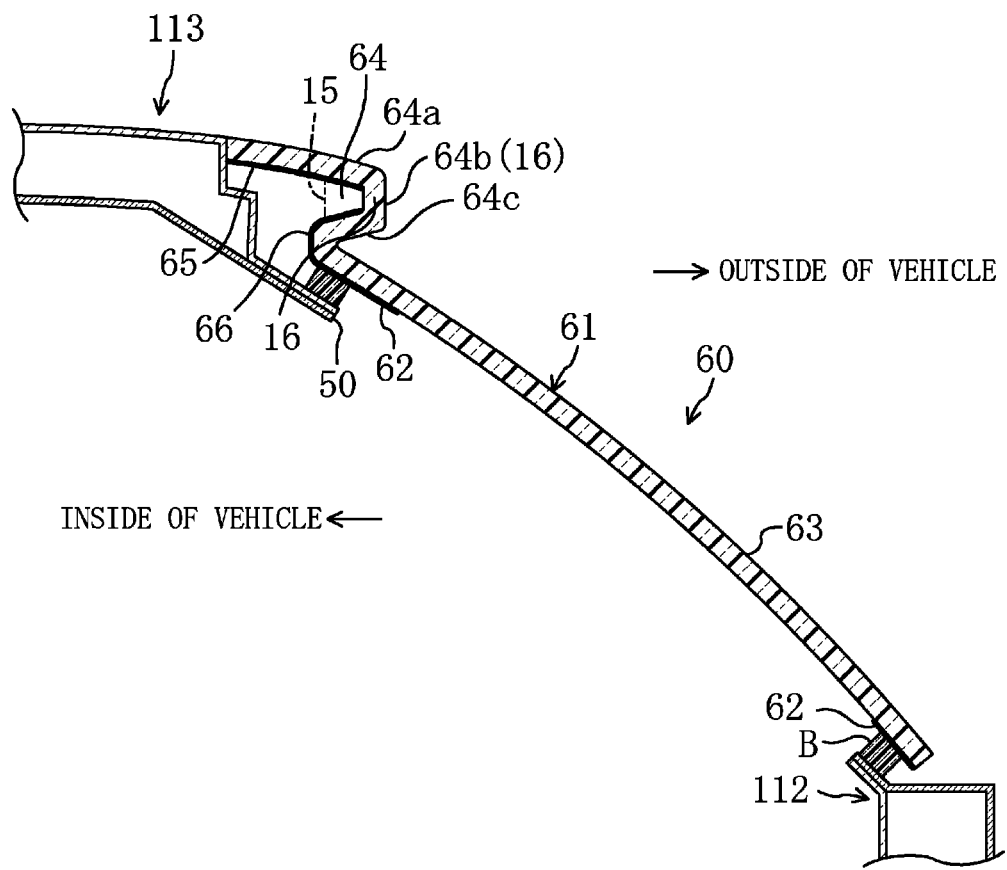
FIG. 11 is a cross-sectional view taken along the line XI-XI in FIG. 10.
Figure 12:
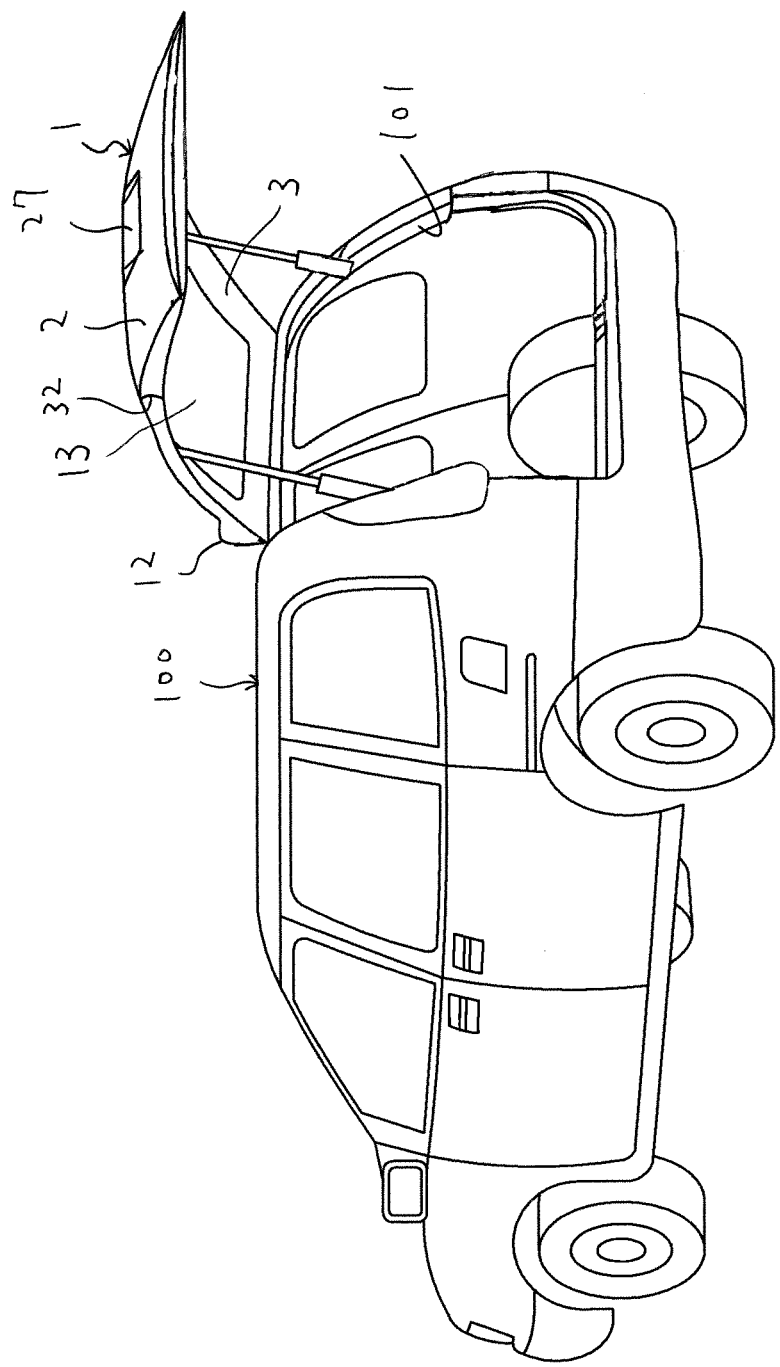
FIG. 12 illustrates the door in the opened position.

FIG. 10 illustrates a back portion of a vehicle 110 according to a second embodiment of the present invention. In this second embodiment, a window opening 50 (illustrated in FIG. 11) is formed in the back portion of the sedan-type vehicle 110, and a vehicle window panel is formed by a rear window panel 60.

The vehicle 110 includes a trunk lid 111. The trunk lid 111 is supported by an automobile body member 112 (illustrated in FIG. 11) obtained by combining laterally extending panel materials together. The window opening 50 forms a laterally extending rectangular shape, and is formed to extend from the front end of the automobile body member 112 to the back end of a roof 113.

The rear window panel 60 includes a panel body 61 molded of the same resin material as the upper portion 10 of the first embodiment. The panel body 61 is larger than the window opening 50, and forms a generally rectangular shape, and the perimeter of the panel body 61 is adhered to a surrounding area of the window opening 50 with an adhesive B. A portion of the panel body 61 located inside a portion thereof adhering to the surrounding area is a window portion 63. A coating film 62 is formed by coating the inner surface of a portion of the vehicle corresponding to a portion of the panel body 61 located around the window portion 63 with a black ceramic paint.

A laterally extending stop lamp assembly receptacle 64 is integrally connected to an upper portion of the panel body 61 to protrude toward the back of the vehicle (the outside thereof), and a stop lamp assembly 15 similar to that in the first embodiment is accommodated in the receptacle 64. The receptacle 64 is shaped to protrude toward the back of the vehicle, thereby enhancing the rigidity of the panel body 61.

The lateral length of the receptacle 64 is set less than that of the panel body 61, and the receptacle 64 is located in a laterally central portion of the panel body 61. An upper wall portion 64a of the receptacle 64 extends to the back end of the roof 113, and the outer surface of the upper wall portion 64a is smoothly continuous with the roof 113. A coating film 65 is formed by coating the inner surface of a portion of the vehicle corresponding to the upper wall portion 64a with a black ceramic paint.

A vertical wall portion 64b extending downward is integrally connected to a portion of the upper wall portion 64a of the receptacle 64 located toward the back end of the vehicle. A lower wall portion 64c extending toward the front of the vehicle is integrally connected to a lower end portion of the vertical wall portion 64b. A coating film 66 is formed by coating the inner surface of a portion of the vehicle corresponding to the lower wall portion 64c with a black ceramic paint, and is continuous with the coating film 62 coating an upper portion of the panel body 61. The vertical wall portion 64b forms a light-transmitting portion 16 for transmitting light from the stop lamp assembly 15 to the outside of the vehicle.

As described above, according to the second embodiment, the resinification of the rear window panel 60 can reduce the weight thereof. Moreover, the receptacle 64 is integrally connected to the panel body 61, thereby enhancing the rigidity of the panel body 61, and enhancing also the rigidity of the window portion 63 integrally connected to the panel body 61. Moreover, since sufficient rigidity of the panel body 61 can be ensured, the weight of the panel body 61 can be reduced by reducing the thickness thereof, and the moldability of the panel body 61 can be enhanced to mold the panel body 61 with a high degree of accuracy. Thus, the panel body 61 with good appearance can be obtained.

The panel body 61 of the second embodiment may include a rear spoiler (protrusion) similar to the rear spoiler 12 of the first embodiment, or may include a protrusion which protrudes from the inner or outer surface of a portion of the vehicle corresponding to the panel body 61 and extends along the panel body 61.

The present invention can be practiced not only with passenger vehicles but also with trucks.

The present invention can be practiced also with sunroof panels for sunroofs.

INDUSTRIAL APPLICABILITY

As described above, the vehicle window panel according to the present invention can be mounted in, e.g., a window opening formed in a back portion of a vehicle.

The invention claimed is:

1. A vehicle back door having an upper end portion which is coupled to a tailgate opening formed in a back portion of the vehicle, comprising:
   an inner panel having a window opening and made of a resin material; and,
   an outer panel placed on the inner panel and having a light-transmitting window portion, the light-transmitting window portion is made of a light-transmitting resin material; wherein,
   the outer panel is formed such that when the back door is opened, a central portion of the back door in a width direction of the vehicle is higher than each of ends of the back door in the width direction of the vehicle, and
   linear protrusions integrally connected to the outer panel, and protrude from each of ends of the outer panel in the width direction of the vehicle to the back portion of the vehicle; and, is configured to guide rain water;
   a spoiler having an upper and lower walls, wherein the upper and lower walls of the spoiler protrude from the upper portion of the outer panel, the upper and lower walls extend in the width direction of the vehicle and are integrally connected to the upper portion of the outer panel, and
   the upper and lower walls of the spoiler, and a portion of the inner panel are integrally joined together to internally have a space having a closed cross-sectional shape.

* * * * *

UNITED STATES PATENT AND TRADEMARK OFFICE
CERTIFICATE OF CORRECTION

PATENT NO. : 8,523,269 B2  Page 1 of 1
APPLICATION NO. : 13/139281
DATED : September 3, 2013
INVENTOR(S) : Tsuyoshi Igura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 19 days.

Signed and Sealed this

Fifteenth Day of September, 2015

Michelle K. Lee
*Director of the United States Patent and Trademark Office*